Patented Feb. 7, 1950

2,496,989

UNITED STATES PATENT OFFICE 2,496,989

AQUEOUS DISPERSION OF ETHYLENE POLYMERS CONTAINING A SALT OF A POLYMERIC AMIC ACID

Martin E. Cupery, Wilmington, Del., assignor to E. I. du Pont de Nemours & Company, Wilmington, Del., a corporation of Delaware No Drawing. Application May 24, 1946, Serial No. 672,153

17 Claims. (Cl. 260—29.6)

1

This invention relates to aqueous dispersions, to methods for preparing such dispersions, and to coating articles therewith. More particularly this invention relates to aqueous dispersions of ethylene polymers, to methods for their preparation and to articles coated with ethylene polymers from aqueous dispersions thereof.

Heretofore aqueous dispersions of ethylene polymers have been made using soaps as dispersing agents. Methods also have been described for the preparation of ethylene polymer dispersions using hydrolyzed polyvinyl acetates as dispersing agents. While for many purposes these aqueous dispersions are satisfactory, they are deficient in certain respects. In many applications the presence of the soap in the dry film is objectionable since it contributes water-sensitivity and leads to poor electrical properties. The ethylene polymer dispersions using hydrolyzed polyvinyl acetates are also deficient in that films prepared from them, after drying are water-sensitive and have lower break-down voltages than the original ethylene polymer. The presence of the dispersing agent in these prior art dispersions makes it impossible to take full advantage of the excellent electrical characteristics of the ethylene polymer.

It is an object of this invention to provide new compositions of matter containing a normally solid ethylene polymer dispersed in an aqueous medium and as the stabilizer for said dispersion a water-soluble compound which does not contribute water-sensitivity to the dry film. A further object is to provide an aqueous dispersion containing a blend of ethylene polymers with another hydrocarbon polymer and a stabilizer which is water-soluble in said aqueous dispersion and becomes water-insensitive in the dry film. A still further object is to provide a method for preparing an aqueous dispersion containing as the dispersoid an ethylene polymer and as the dispersing agent a salt selected from the class of water-soluble ammonium and basic amine salts of a polymeric N-monoalkyl substituted amic acid. Another object is to coat articles with ethylene polymers from aqueous dispersions containing a water-soluble dispersing agent which becomes water-insensitive in the dry film. An additional object is to provide articles containing a coating of ethylene polymer and the insolubilized products derived from an ammonium or basic amine salt of a polymeric N-monoalkyl substituted amic acid. Still another object is to provide articles coated with films laid down from aqueous dispersions of ethylene polymers

2 containing as the dispersing agent a water-soluble ammonium or basic amine salt of a polymeric N-monoalkyl substituted amic acid, said coating having substantially the breakdown voltage of the original ethylene polymer and being water-insensitive. Other objects will appear hereinafter.

These objects are accomplished by providing new compositions comprising a normally solid ethylene polymer dispersed in an aqueous medium and as the stabilizer for the dispersion a water-soluble salt of the class consisting of ammonium and basic amine salts of a polymeric N-monoalkyl substituted amic acid.

It has now been discovered that excellent dispersions comprising ethylene polymers can be made using as the dispersing agent a water-soluble ammonium or basic amine salt of a polymeric N-monoalkyl substituted amic acid and that films laid down from such dispersions have substantially the breakdown voltage of the original ethylene polymer and are water-insensitive.

In this invention it is preferable to use a water-soluble ammonium or basic amine salt of a long chain N-monoalkyl substituted polymeric amic acid or of a mixed N-monoalkyl substituted polymeric amic acid in which some of the amide meric amic acid in which some of the amide nitrogen atoms have a short chain monoalkyl substituent and other of the amide nitrogen atoms have a long chain monoalkyl substituent. By "short chain monoalkyl substituent" is meant that a single alkyl group containing less than seven carbon atoms is attached to the amide nitrogen of the polymeric amic acid. Typical short chain alkyl groups are ethyl, propyl, isopropyl, butyl, amyl and the like. By "long chain monoalkyl substituent" is meant that a single alkyl group containing at least seven carbon atoms is attached to the amide nitrogen of the polymeric amic acid. Typical long chain alkyl groups are heptyl, octyl, decyl, dodecyl, octadecyl and the like.

By "basic amine" is meant an amine having an ionization constant value greater than $1 \times 10^{-6}$, when measured at 25° C. By "water-soluble amine" is meant an amine which is soluble to the extent of at least 5 parts per 100 parts of water at 25° C. Examples of water-soluble basic amines are methylamine, ethylamine, diethylamine, ethanolamine, hydrazine, piperidine, morpholine, and the like.

The aqueous dispersions are made by a process which comprises mechanically working at an elevated temperature of at least 95° C. and up to about 115° C. a normally solid ethylene polymer with a water-soluble ammonium or amine salt of a polymeric N-monoalkyl substituted amic acid until a homogeneous blend is obtained, thereafter cutting off the source of heat and while continuing to do work on the blend gradually adding water containing in solution ammonia or a basic amine until the water-in-polymer dispersion which forms inverts to a polymer-in-water dispersion. The resulting dispersion may be diluted with water to any desired solids content.

As a rule the dispersions of this invention are made by mechanically working into the ethylene polymer at a temperature of at least 95° C., until a homogeneous blend is obtained, a polymeric N-monoalkyl substituted amic acid in which the recurring two non-oxo-carbonyl groups are directly attached to adjacent carbon atoms in the polymeric chain, thereafter the heat is turned off, water containing a member of the class of ammonia and water-soluble basic amines in amount sufficient to form the water-soluble salt of the amic acid is added, and while cooling there is continued the addition of water containing a member of the class of ammonia and water-soluble basic amines until the water-in-polymer dispersion which forms inverts to a polymer-in-water dispersion. The dispersion thus formed may be reduced to the desired solids content by dilution with water.

In the application of the water-soluble ammonium or amine salts of the polymeric N-monoalkyl substituted amic acids to form the aqueous dispersions, the amount used will generally vary from about 1 to 30% of the weight of ethylene polymer. However, the amount will vary to some extent depending upon the particular amic acid dispersing agent which is used.

The mechanical working of the water-soluble ammonium or amine salt of the polymeric N-monoalkyl substituted amic acid into the ethylene polymer is effected in devices capable of doing internal work on the mixture. Examples of such mixers, which are capable of doing work on the polymer and dispersing agent, are the Banbury and Werner-Pfleiderer types and modifications of these mixers. In the rotary type Banbury mill, the block and rotors can be heated with hot water or steam. When the ethylene polymer is milled in such a device at a temperature a few degrees below its softening point, that is, at temperatures above 95° C., it becomes plastic. The plastic state is best suited for the incorporation of the water-soluble ammonium or amine salt of the polymeric N-monoalkyl substituted amic acid. A homogeneous blend of ethylene polymer and dispersing agent is produced.

Through the employment of the water-soluble ammonium or amine salt of the polymeric N-monoalkyl substituted amic acids, aqueous dispersions which are stable and in which the particles are small and uniform in size can be made. These dispersions may contain up to 75% or more of the ethylene polymer. Articles having coatings which are water-insensitive and which have excellent electrical insulation properties are formed by contacting the articles with an aqueous dispersion containing ethylene polymer and as the dispersing agent a water-soluble ammonium or basic amine salt of an N-monoalkyl substituted polymeric amic acid, drying the article thus coated and then treating the article under conditions such as to bring about inactivation of the dispersing agent and conversion to a water-insoluble form. Although inactivation can generally be brought about by prolonged exposure of the coated article at ordinary temperatures, it is preferred to heat or bake the coated article at elevated temperatures of approximately 50° to 250° C. At the higher temperatures the time required to inactivate and convert the polymeric amic acid dispersing agent to an insoluble product is materially reduced. As a rule therefore, it is preferred to bake at as high a temperature as possible without obtaining decomposition effects.

The water-soluble ammonium or basic amine salts of the N-monoalkyl substituted polymeric amic acid stabilizers can be made by suspending a polymeric polycarboxylic acid anhydride in an organic solvent, such as benzene, and adding to the suspension, ammonia or an alkyl amine. In the amidation, it is preferred to employ one mole of the ammonia or alkyl amine per mole equivalent of the polymeric polycarboxylic acid anhydride. However, proportions outside this amount can be used. The polymeric N-monoalkyl substituted amic acid thus obtained can be treated with ammonia or amine until it is converted to the ammonium or amine salt. If desired, the ammonium or amine salt can be isolated by filtration or by other means known to the art.

An alternative method for making the ammonium or amine salts of the polymeric N-monoalkyl substituted amic acids, which is particularly applicable to the preparation of long chain N-alkyl polymeric amic acids, is by dissolving the polymeric acid anhydride in a suitable organic solvent, such as methyl ethyl ketone, and adding a long chain primary alkyl amine with stirring. The resulting product is then treated either with dilute ammonium hydroxide or with the desired amine and the salt can be isolated by filtration.

By "polymeric acid anhydride" as used herein is meant the product obtained by condensing a polymerizable organic compound containing an ethylenic double bond as the sole aliphatic carbon-to-carbon unsaturation with a butenedioic acid anhydride having the general formula

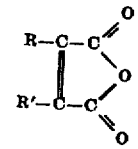

where R and R' are selected from the group consisting of hydrogen atoms and alkyl, aryl, aralkyl and cycloaliphatic radicals, for example, methyl, ethyl, propyl, octadecyl, phenyl, tolyl, xylyl, benzyl, cyclohexyl, and the like. Examples of such polymerizable organic compounds are ethylene, propylene, butylene, isobutylene, styrene, indene, vinyl acetate, methyl methacrylate, and the like. Suitable methods for effecting the condensation between the butenedioic acid anhydride and the polymerizable organic compound are described in U. S. Patents 2,047,398 issued July 14, 1936, and 2,378,629 issued June 19, 1945. In these polymeric acid anhydrides, the two recurring non-oxo carbonyl groups are on adjacent carbon atoms.

The preferred polymeric acid anhydrides for the preparation of the N-monoalkyl substituted amic acids are those obtained by condensing one mole of maleic anhydride with one mole of styrene. Of these, those having a viscosity in the range of from 0.2 to 650 centipoises at 25° C., measured as 15% solutions in methyl ethyl ketone, are preferred.

The N-monoalkyl substituted amic acids obtained by reacting in molar equivalent proportions a styrene/maleic anhydride condensation product, having a viscosity of from 6 to 100 centipoises when measured as a 15% solution in methyl ethyl ketone at 25° C., with a 1:1 mole mixture of butyl and octadecyl amines are particularly preferred. These are converted to the water-soluble ammonium or amine salts, preferably the morpholine salt, by reaction with an amount of ammonia or amine required to react with the free carboxyls in the amic acid.

This invention is further illustrated by the following examples in which parts are by weight, unless otherwise stated.

Example I

Two hundred parts of an ethylene polymer having a molecular weight of about 17,000 and a softening point of 105°–110° C. is milled in a Banbury mixer at 100° C. To it is added 16 parts of polymeric octadecyl-butyl styrene/maleamic acid, obtained by reacting one mole of a styrene/maleic anhydride polymer (having a viscosity of 14 to 70 centipoises at 25% solids in methyl ethyl ketone at 25° C.) with one mole of an equimolar mixture of n-octadecyl amine and n-butyl amine. When the total octadecyl-butyl styrene/maleamic acid has been incorporated into the ethylene polymer, the steam in the mixer is turned off, an amount of morpholine is added sufficient to form the morpholine salt of the amic acid and the gradual addition of water containing an additional molar quantity of morpholine is begun. As the temperature of the polymer drops, the water is gradually taken up and a water-in-polymer dispersion is formed. Upon continued gradual addition of water, this dispersion inverts to a thick polymer-in-water dispersion of paste-like consistency. On completion of the process of inversion, the solids content of the dispersion is 60–70%. The dispersion can be diluted with water to any desired concentration. The particle size is small and uniform, ranging between 3 and 4 microns.

A fabric coated with the dispersion prepared above and then heated to insolubilize the dispersing agent gives a breakdown voltage value of 850 volts/mil. Under similar conditions, a fabric coated with an ethylene polymer dispersion prepared with polyvinyl alcohol and an alkali metal salt of a sulfated long chain alcohol has a breakdown voltage of 490 volts/mil.

Example II

Example 1 is duplicated using 8 parts of the polymeric octadecyl-butyl styrene/maleamic acid dispersing agent. An excellent dispersion is obtained.

Example III

Example 1 is duplicated using as the dispersing agent the ammonium salt of polymeric styrene/maleamic acid. The average particle size of the dispersion is 10 microns.

Example IV

Example 1 is duplicated using 28 parts of the ammonium salt of polymeric dodecyl styrene/maleamic acid as the dispersing agent. A fabric coated with this dispersion has a breakdown voltage of 933 volts/mil as compared with 490 volts/mil for a fabric coated with an ethylene polymer dispersion prepared with polyvinyl alcohol and an alkali metal salt of a sulfated long chain alcohol as the dispersing agent.

Example V

Example 1 is duplicated using instead of the ethylene polymer alone, a blend consisting of 132 parts of the ethylene polymer with 88 parts of a polyisobutylene having an average molecular weight of about 60,000 and as a dispersing agent, the ammonium salt of polymeric octadecyl-butyl styrene/maleamic acid obtained by reacting 1 mole of the styrene/maleic anhydride polymer of Example 1 with 1 mole of an equimolar mixture of octadecyl amine and butyl amine. The dispersion obtained is applied to a fabric and, after fusion, is used as a backing material for a pressure sensitive adhesive.

Example VI

A dispersion is made from the ethylene polymer of Example 1 using as a dispersing agent, the polymeric octadecyl-butyl styrene/maleamic acid ammonium salt of Example III and the dispersion is applied to paper by dipping. The excess dispersion is scraped off and the paper dried by heating at 100° C. The paper is then heated for one minute in a press at 170° C. under 500 lbs./sq. in. pressure. The product obtained has a hard glossy finish. The electrical properties of the treated paper are as follows:

| Type of paper | Treatment | Dielectric Constant | Power Factor |
|---|---|---|---|
| Absorbent Kraft paper. | Untreated-control | 2.11 | 0.0116 |
| Do | Treated, but not fused | 2.62 | 0.0076 |
| Grey sized paper | Untreated-control | 3.81 | 0.0110 |
| Do | Treated, but not fused | 3.14 | 0.0094 |
| Do | Treated and fused under pressure. | 3.55 | 0.0055 |

The improvement in electrical properties is reflected in the lower power factor as compared to the controls.

Example VII

A dispersion is made from the ethylene polymer of Example 1 using as a dispersion agent the polymeric octadecyl-butyl styrene/maleamic acid ammonium salt and the dispersion is applied to electroplating racks as follows:

The dipping operation is accomplished by lowering the rack into the liquid polythene dispersion, then withdrawing it at a slow steady rate so as to allow excess dispersion to run off. After excess drippings are off the rack, it is then ready for immediate baking. Three such coats are applied with baking for 15 to 30 minutes in an air oven at 300–350° F. between coats. Following the last coat, the rack is baked under the above conditions for 1–2 hours before being placed in service.

Another plating rack of somewhat simpler design is coated by brushing, the liquid polythene dispersion being applied using much the same technique as used for application of ordinary paint. The usual type of paint brush is satisfactory and the brush should be washed out with water following each use. Brushing should be carried out to give a reasonably smooth uniform coat. If difficulty is experienced in brushing polythene dispersion smoothly, a small amount of thinning with water is useful. Three brush coats are applied with the same baking schedule as used for dip coated racks.

The product in each case has a hard glossy finish providing durability with respect to abrasive action and excellent resistance to chemical action of alkali cleaning, acid pickling and all plating solutions including chromium.

Although in the examples, the ammonium or basic amine salt of the polymeric N-monoalkyl substituted amic acid has been synthesized in situ, it is to be understood that preformed salt can be used and ammonia or basic amine added to compenate for that lost on heating.

The term "ethylene polymer" is used herein to refer to the products obtained by polymerizing ethylene alone, as described in U. S. Patents 2,153,553 issued April 11, 1939, and 2,188,465 issued January 30, 1940, or by polymerizing ethylene in admixture with other polymerizable organic compounds as described in U. S. Patents 2,200,429 issued May 14, 1940, 2,394,960 issued February 12, 1946, 2,388,225 issued October 30, 1945. 2,334,195 issued November 16, 1943, and 2,342,400 issued February 22, 1944. For use in connection with electrical applications, the preferred ethylene polymers are those melting in the range of 100° C. to 120° C. and which are obtained by polymerizing ethylene alone, as described in the forementioned patents.

The aqueous dispersion contains the dispersing agent and ethylene polymer alone or the dispersing agent and a blend of ethylene polymer with another hydrocarbon polymer, for example polyisobutylene. In dispersions of such blends, the ethylene polymer component constitutes at least 60% by weight of the blend. In addition to the ethylene polymer or ethylene-polyisobutylene polymers, these dispersions may contain pigments, fillers, dyes and the like.

The dispersions of this invention are useful in the coating of paper, cloth, and numerous other articles. They are especially useful for the coating of electroplating racks, since upon drying and fusion, they are water-insensitive and the coating is substantially non-conducting.

As many apparently widely different embodiments of this invention may be made without departing from the spirit and scope thereof, it is to be understood that I do not limit myself to the specific embodiments thereof except as defined in the appended claims.

I claim:

1. A composition containing in aqueous dispersion a solid ethylene polymer and a salt of the class consisting of ammonium and water-soluble basic amine salts of an N-monoalkyl substituted polymeric amic acid of an interpolymer of a polymerizable organic compound containing an ethylenic double bond as the sole aliphatic carbon-to-carbon unsaturation with a butanedioic acid anhydride, the recurring two non-oxo carbonyl groups in said polymeric amic acid being attached directly to adjacent carbon atoms of the polymeric chain which contains structural units in which the amide nitrogen atom has attached thereto hydrogen and a long-chain monoalkyl substituent of at least seven carbon atoms, the basic amines of said salts being those having an ionization constant value greater than $1 \times 10^{-6}$ when measured at 25° C. and being soluble to the extent of at least five parts per 100 parts of water at 25° C.

2. A composition as set forth in claim 1 in which the ethylene polymer consists solely of polymerized ethylene.

3. An article having a coating of the ethylene polymer and salt set forth in claim 1.

4. A composition containing in aqueous dispersion a solid ethylene polymer, and a water-soluble basic amine salt of an N-monoalkyl substituted polymeric amic acid of an interpolymer of a polymerizable organic compound containing an ethylenic double bond as the sole aliphatic carbon-to-carbon unsaturation with a butenedioic acid anhydride, the recurring two non-oxo carbonyl groups in said polymeric amic acid being attached directly to adjacent carbon atoms of the polymeric chain which contains structural units in which the amide nitrogen atom has attached thereto hydrogen and a long-chain monoalkyl substituent of at least seven carbon atoms and structural units in which the amide nitrogen atom has attached thereto hydrogen and a short-chain monoalkyl substituent of less than seven carbon atoms, the basic amine salt being that of an amine having an ionization constant value greater than $1 \times 10^{-6}$ when measured at 25° C. and being soluble to the extent of at least five parts per 100 parts of water at 25° C.

5. A composition containing in aqueous dispersion a solid ethylene polymer and a water-soluble basic amine salt of an N-monoalkyl substituted polymeric styrene/maleamic acid which contains structural units in which the amide nitrogen atom has attached thereto hydrogen and a long-chain monoalkyl substituent of at least seven carbon atoms, the basic amine salt being that of an amine having an ionization constant value greater than $1 \times 10^{-6}$ when measured at 25° C. and being soluble to the extent of at least five parts per 100 parts of water at 25° C.

6. A composition containing in aqueous dispersion a solid ethylene polymer and a water-soluble basic amine salt of an N-monoalkyl substituted polymeric styrene/maleamic acid which contains structural units in which the amide nitrogen atom has attached thereto hydrogen and a long-chain monoalkyl substituent of at least seven carbon atoms and structural units in which the amide nitrogen atom has attached thereto hydrogen and a short-chain monoalkyl substituent of less than seven carbon atoms, the basic amine salt being that of an amine having an ionization constant value greater than $1 \times 10^{-6}$ when measured at 25° C. and being soluble to the extent of at least five parts per 100 parts of water at 25° C.

7. A composition as set forth in claim 5 in which the ethylene polymer consists solely of polymerized ethylene.

8. An article having a coating of the ethylene polymer and basic amine salt set forth in claim 5.

9. A composition containing in aqueous dispersion a solid ethylene polymer, consisting solely of polymerized ethylene, and the morpholine salt of octadecyl-butyl N-monoalkyl substituted polymeric styrene/maleamic acid.

10. A fabric having a coating of the ethylene polymer and morpholine salt set forth in claim 9.

11. A composition containing in aqueous dispersion a solid ethylene polymer, consisting solely of polymerized ethylene, and the ammonium salt of octadecyl-butyl N-monoalkyl substituted polymeric styrene/maleamic acid.

12. Paper having a coating of the ethylene polymer and ammonium salt set forth in claim 11.

13. A composition containing in aqueous dispersion a solid ethylene polymer and the ammonium salt of an N-monoalkyl substituted polymeric amic acid of an interpolymer of a polymerizable organic compound containing an ethylenic double bond as the sole aliphatic carbon-to-carbon unsaturation with a butenedioic acid anhydride, the recurring two non-oxo carbonyl groups in said polymeric amic acid being attached directly to adjacent carbon atoms of the polymeric chain which contains structural units in which the amide nitrogen atom has attached thereto hydrogen and a long-chain monoalkyl substituent of at least seven carbon atoms and structural units in which the amide nitrogen atom has attached thereto hydrogen and a short-chain monoalkyl substituent of less than seven carbon atoms.

14. A composition containing in aqueous dispersion a solid ethylene polymer and the ammonium salt of an N-monoalkyl substituted polymeric styrene/maleamic acid which contains structural units in which the amide nitrogen atom has attached thereto hydrogen and a long-chain monoalkyl substituent of at least seven carbon atoms.

15. A composition containing in aqueous dispersion a solid ethylene polymer and the ammonium salt of an N-monoalkyl substituted polymeric styrene/maleamic acid which contains structural units in which the amide nitrogen atom has attached thereto hydrogen and a long-chain monoalkyl substituent of at least seven carbon atoms and structural units in which the amide nitrogen atom has attached thereto hydrogen and a short-chain monoalkyl substituent of less than seven carbon atoms.

16. An article having a coating of the ethylene polymer and ammonium salt set forth in claim 14.

17. A composition as set forth in claim 14 in which the ethylene polymer consists solely of polymerized ethylene.

MARTIN E. CUPERY.

REFERENCES CITED

The following references are of record in the file of this patent:

UNITED STATES PATENTS

| Number | Name | Date |
|---|---|---|
| 1,976,679 | Fikentscher et al. | Oct. 9, 1934 |
| 2,386,674 | Flint et al. | Oct. 9, 1945 |